Oct. 24, 1933.                R. R. SANDERSON                1,931,590
                                 DRILL BIT
                              Filed July 30, 1932

INVENTOR
Ray R. Sanderson
BY Evans & McCoy
ATTORNEYS

Patented Oct. 24, 1933

1,931,590

UNITED STATES PATENT OFFICE 1,931,590

DRILL BIT

Ray R. Sanderson, Orville, Ohio

Application July 30, 1932. Serial No. 626,901

4 Claims. (Cl. 255—63)

This invention relates to a drill bit assembly for use in churn and percussion drilling, and more particularly to improved means for securing a drill bit tip to a drill bit blade.

In my co-pending applications Serial No. 614,866, filed June 2, 1932, and Serial No. 626,902, filed July 30, 1932, I have disclosed a drill bit tip and means for removably mounting the bit tip upon a drill bit blade. This invention is a further modification of the inventions there disclosed and generically claimed.

In the past drill bits have commonly been of single piece construction. It has been the practice to repeatedly re-sharpen one end of such a bit to provide a new cutting edge as the bit became dull in service.

In the applications above referred to, and also in the present application, the older form of drill bit, which is usually long and cumbersome, is replaced by a bit blade at one end of which a plurality of removably secured drill bit tips may be consecutively mounted.

An object of the present invention is to provide such a removable drill bit tip at one end of a drill bit blade, the tip having a continuous unbroken cutting face and cutting edge and having no downwardly or laterally opening apertures objectionably close to the cutting edge of the assembly.

A further object is to provide a removable drill bit tip for mounting at the end of a drill bit blade, which may be assembled and disassembled with a minimum expenditure of time and labor.

A further object is to provide a removable drill bit tip and drill bit blade assembly, the parts of which may be cheaply and easily manufactured with ample accuracy to provide a successful and usable tool.

A further object is to provide a drill bit tip and drill bit blade assembly which is positively secured against separation while in service.

Another object is to provide means disposed inwardly of a removable drill bit tip and blade assembly, which means may be adjustably operated from a point remote from the drill bit tip, for tightly and rigidly securing the drill bit tip to the end of a drill bit blade.

Another object is to provide a drill bit assembly consisting of a bit tip removably secured to a bit blade along impact faces forming a part of each, the bit blade being adapted to be cut back and a new impact face formed thereon in the event of injury to its original impact face without necessitating a material change in the securing means.

With the above and other objects in view, which will be readily apparent from the following detailed description, the present invention may be said to consist in certain constructions and combinations of parts which will be readily understood by those skilled in the art to which the invention appertains.

Figure 1:
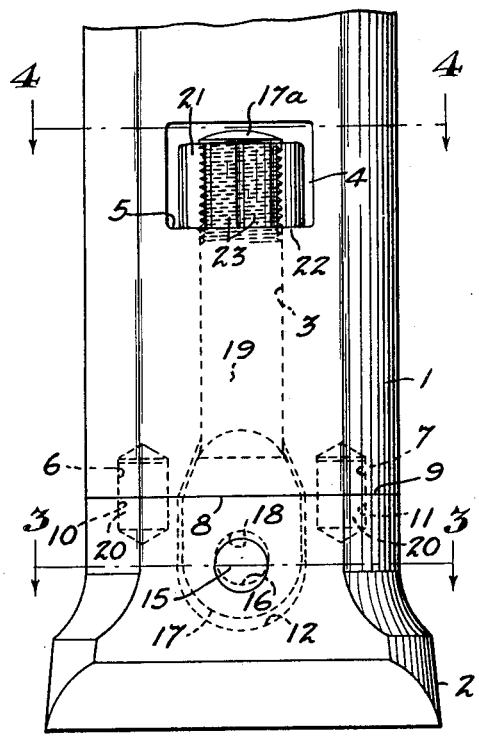
Figure 1 is a side elevational view of the drill bit blade and drill bit tip assembly.
Figure 2:
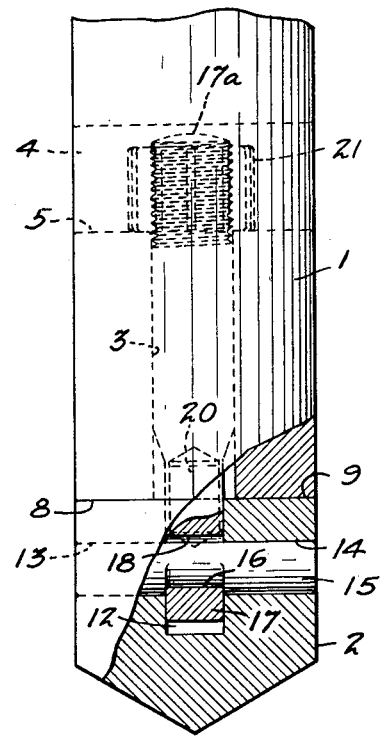
Fig. 2 is an end elevational view, partly in section, showing the drill bit tip in assembled relation with a drill bit blade.

A drill bit assembly forming the subject-matter of the present invention comprises a drill bit blade 1 to the lower end of which a drill bit tip 2 is secured by fastening means which are disposed chiefly within the assembly.

The drill bit blade 1 has a bolt shaft accommodating aperture 3 formed centrally and longitudinally thereof and terminating upwardly in a nut-receiving aperture 4 that is formed transversely of the bit blade. The aperture 4 is of somewhat larger lateral dimension than the aperture 3, thus forming a shoulder 5 at their junction. Suitable dowel-receiving apertures 6 and 7 are formed inwardly of the impact face 8 of the drill bit blade. The impact face 8 is formed substantially perpendicular to the axis of the drill bit assembly.

The drill bit tip 2 terminates upwardly in an impact face 9 designed to engage the impact face 8 forming the lower extremity of the drill bit blade 1. Suitable dowel apertures 10 and 11 are formed inwardly of the impact face 9 and are positioned substantially centrally of the impact face 9 and of the drill bit tip. The aperture 12 is placed to register upwardly with the aperture 3. The aperture 12 opens laterally and below the impact face 9 into a pair of pin-receiving apertures 13 and 14 which preferably are formed within the body of the bit tip in line with each other and in a direction which is substantially at right angles to the axis of the bit blade.

The cross pin 15 or other suitable bolt head-receiving device, may be positioned within the apertures 13 and 14. Motion of the cross pin 15 with respect to the bit tip is prevented by the groove 16 formed in one side and substantially midway between the ends of the pin 15 or by other suitable stop means.

The bit blade and bit tip may be secured together by any suitable device such as a bolt 17a having a head portion 17 positioned within the aperture 12 and having an eye 18 formed in the head through which the cross pin 15 may pass. A portion of the bolt head 17 seated within the groove 16 prevents motion of the pin 15 longitudinally of itself as described. The shaft 19 of the bolt is positioned within the aperture 3 formed in the drill bit blade and is threaded upon its upper end. Suitable dowel members, keys or stops 20 may be housed within the dowel apertures 10 and 11.

A nut 21 or other shaft engaging means may be positioned within the nut-receiving aperture 4 and be threaded upon the upper portion of the bolt shaft 19. When in tightly locked engagement, the lower side 22 of the nut is in tightly compressing engagement with the shoulder 5 of the drill bit blade and holds the impact faces 8 and 9 in closely contacting relation with each other throughout their area. Suitable wrench-engaging portions such as the externally disposed splines 23 may be carried upon the periphery of the nut 21 as desired.

In the present construction the drill bit tip may be quickly and easily mounted upon the end of the drill bit blade.

Either of two methods may be followed in securing such assembly.

The bolt shaft 19 may first be inserted within the longitudinal aperture 3 formed in the drill bit blade and the internally threaded nut 21 be placed within the aperture 4 and given a few turns upon the threaded upper end of the bolt shaft 19. Dowel members 20 may then be placed in the apertures 10 and 11 formed in the upper surface of the drill bit tip and the impact face 9 of the drill bit tip caused to approach the impact face 8 of the drill bit blade in such a manner that the dowels 20 are in line with the apertures 6 and 7 formed in the drill bit blade, and the bolt head 17 is within the aperture 12, formed centrally of the drill bit tip. One end of the pin 15 may then be thrust through the aperture 13, the eye 18 and the aperture 14 with the transverse groove formed in the pin 15 positioned away from the shaft of the bolt. Continued rotation of the nut 21 will then place the shoulders 22 and 5 and the mating faces 8 and 9 in closely compressing relation with each other. The entrance of water into the interior of the mechanical parts by way of these contacting surfaces is thereby substantially eliminated. This method of assembly, in which the pin 15 is inserted last, is to be preferred in exchanging drill bit tips at the end of the drill bit blade, because of its greater ease and rapidity of operation.

A second method of assembling the drill bit tip and drill bit blade is to first position the head 17 of the bolt well down into the aperture 12 formed in the bit tip. The cross-pin 15 may then be inserted into the aperture 13 formed in the bit tip with the groove 16 of the pin 15 away from the shaft 19 of the bolt. The cross-pin 15 may then be thrust through the eye 18 of the bolt head into the aperture 14 and positioned within the apertures 13 and 14 in such a position that the ends of the pin are substantially flush with the outer surfaces of the bit tip. Dowels 20 may then be positioned within the apertures 10 and 11 formed in the bit tip, the bolt shaft inserted within the aperture 3, and the nut 20 positioned within the aperture 4 and threaded upon the upper end of the bolt shaft and strongly tightened to securely mount the bit tip on the end of the bit blade.

Should the service to which the drill bit assembly is subjected be of unusual severity and the parts become wedged together so that they do not separate freely, a wrench may be used upon the nut 21 to place its upper edge in strong compressing contact with the upper face of the aperture 4 and by continued rotation of the nut 21 the bolt shaft may be used to force the separation of the bit tip from the bit blade.

Figure 3:
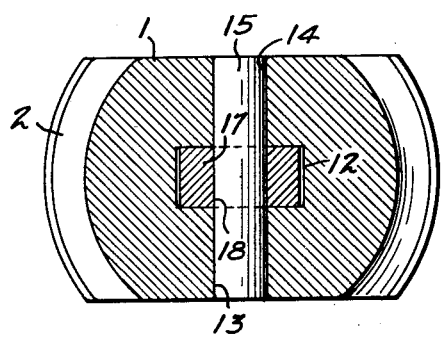
Fig. 3 is a transverse sectional view taken along line 3—3 of Fig. 1.
Figure 4:
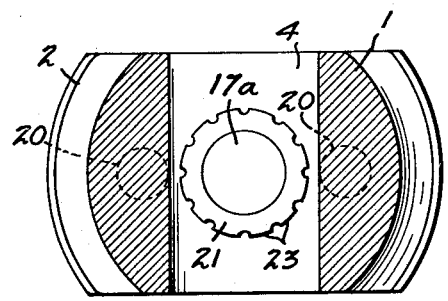
Fig. 4 is a transverse sectional view taken along line 4—4 of Fig. 1.

An assembly of this construction has the advantages of having a continuous, unbroken cutting blade at its lower extremity, and since the pin 8 forms a close fit within its aperture transversely of the drill bit tip 2, this assembly has substantially no apertures at or near the rock-engaging zone, which permit appreciable quantities of water to penetrate into the mechanical parts of the structure. As shown in Fig. 3, the mating faces 3 and 4 may be of very large area. The transverse aperture 15 formed through the drill bit blade is well removed from the cutting area and presents no objectionable features in service. There are no laterally extending parts upon the structure which might become battered or injured through operation of the drill in the drill hole.

In the event that the impact face of the drill blade becomes battered or injured from any cause, the drill blade may be refinished by cutting off a portion of the lower end and regrinding and rehardening the blade. This may be carried on until only a very short length of shaft remains on the clamping bolt, at which time the blade may be cut away above the transverse aperture and new clamping and securing apertures made in the blade with a refinished impact face to properly engage the bit tip. This provides a blade of very long life that will last almost indefinitely.

It is to be understood that the particular embodiments of the present invention shown and described are presented for purposes of illustration and explanation and that various modifications in the type of nut and bolt used, and in the manner of securing the same to the drill bit tip may be used without departing from the invention as defined in the appended claims.

What I claim is:

1. A drill bit assembly for use in churn and percussion drilling, comprising a drill bit blade having a bolt shaft-receiving aperture formed centrally and longitudinally thereof, an impact face forming a part of said bit blade and through the substantial center of which impact face the bolt shaft-receiving aperture is formed, a dowel-receiving aperture offset from said bolt shaft-receiving aperture, said bit blade having a nut-receiving aperture formed transversely thereof and opening into the bolt shaft-receiving aperture inwardly of said impact face, a drill bit tip having a bolt head-receiving aperture registering with said bolt shaft-receiving aperture formed in the bit blade, an impact face forming the bit blade contacting part of the bit tip, said bit tip having a cross-pin-receiving aperture formed therein substantially perpendicular to said bolt shaft-receiving aperture and below the impact face of said bit tip and opening outwardly of said bit tip, a cross-pin for positioning within said cross-pin-receiving aperture, said cross-pin having a depressed central portion, a bolt head positioned within said bolt head-receiving aperture and being apertured to form an eye of sufficient dimension to freely admit said cross-pin, a bolt shaft integral with said bolt shaft and positioned within said bolt shaft-receiving aperture formed in said bit blade, and a nut positioned with said nut-receiving aperture in said bit blade and forming threaded connection with said bolt shaft.

2. A drill bit assembly for use in churn and percussion drilling, comprising a drill bit blade having a bolt shaft-receiving aperture formed longitudinally thereof, said bit blade having a bolt-tightening means aperture positioned inwardly of the end of said bit blade and opening into said shaft-receiving aperture, said bit blade having a dowel-receiving socket offset from said bolt shaft-receiving aperture, a drill bit tip having a bolt head-receiving aperture registering with said bolt shaft-receiving aperture and that is closed downwardly of said bit tip, said bit tip having a dowel-receiving socket offset from said bolt head-receiving aperture, separate means positioned within said bit tip for securing said bolt head therein, a bolt having a head portion for positioning within said bolt head-receiving aperture and which need not be removed from said bolt shaft-receiving aperture during removal and replacement of successive bit tips, a shaft portion integral with said head portion for positioning in said bolt shaft-receiving aperture and extending into said bolt tightening means aperture, and means positioned within said bolt tightening means aperture for tightening said bolt.

3. A drill bit assembly for use in churn and percussion drilling, comprising a drill bit blade having a bolt shaft-receiving aperture formed longitudinally thereof, said bit blade having a nut-receiving aperture positioned inwardly of the end thereof and opening into said shaft-receiving aperture and being of somewhat greater lateral dimension than said shaft-receiving aperture, a shoulder formed at the junction of said nut receiving aperture and said shaft receiving aperture, said bit blade having a dowel-receiving socket offset from said bolt shaft-receiving aperture, a drill bit tip having a bolt head-receiving aperture closing downwardly of said bit tip and registering with said bolt shaft-receiving aperture, said bit tip having a dowel-receiving socket offset from said bolt head-receiving aperture, bolt head securing means disposed within said bit tip, a bolt for positioning within said bolt shaft-receiving aperture and adapted for remaining in said bolt shaft-receiving aperture during the removal and replacement of successive bit tips and extending into said bolt nut-receiving aperture and forming engagement with said bolt head securing means, a nut positioned within said bolt nut-receiving aperture designed to make adjustable connection with said bolt and designed to form compressing engagement with said shoulder, and stop means positioned within said dowel sockets for preventing rotary movement of said drill bit tip with respect to said bit blade when in mounted relation.

4. A drill bit assembly for churn and percussion drilling, comprising a drill bit blade, a drill bit tip, a bolt having a cross pin-receiving apertured head portion adapted to be freely inserted within a downwardly closed aperture formed in said bit tip and a shaft portion positioned within a bolt shaft-receiving aperture formed longitudinally of said bit blade and which bolt shaft portion may remain in said bolt shaft-receiving aperture during replacement of successive bit tips, a bolt nut positioned within a nut-receiving aperture opening into said bolt shaft-receiving aperture formed in said bit blade, a cross pin removably positioned within a pin-receiving aperture formed in said bit tip and within said apertured head portion of said bolt, and means for preventing rotary movement of said bit tip relative to said bit blade.

RAY R. SANDERSON.